United States Patent [19]

Tsinberg

[11] Patent Number: 4,837,619
[45] Date of Patent: Jun. 6, 1989

[54] SCAN RATE CONVERSION APPARATUS AND METHOD

[75] Inventor: Mikhail Tsinberg, Riverdale, N.Y.

[73] Assignee: North American Philips Corporation, New York, N.Y.

[21] Appl. No.: 114,465

[22] Filed: Oct. 28, 1987

[51] Int. Cl.$^4$ .............................................. H04N 7/01
[52] U.S. Cl. ..................................... 358/140; 358/138
[58] Field of Search ......................... 358/137, 138, 140

[56] References Cited

U.S. PATENT DOCUMENTS

| 4,398,217 | 8/1983 | Peters | 358/138 |
| 4,468,708 | 8/1984 | Coleman, Jr. | 358/138 X |
| 4,551,753 | 11/1985 | Nishizawa et al. | 358/138 X |
| 4,620,225 | 10/1986 | Wendland et al. | 358/137 X |

OTHER PUBLICATIONS

Line Interpolation by K. H. Barratt and J. H. Taylor, Sep. 1976, IBA Technical Review, pp. 49–62.
Digital Standards Conversion by J. L. E. Baldwin, Sep. 1976, IBA Technical Review, pp. 3–15.

Primary Examiner—James J. Groody
Assistant Examiner—Victor R. Kostak
Attorney, Agent, or Firm—Marianne R. Rich

[57] ABSTRACT

A signal processor useful for a non-integer scan rate conversion and non-integer sampling rate conversion, applies multiplicative factors to a multiplicity of initial data elements which are then summed to obtain a data element at the new sampling or scanning rate. Each multiplicative factor is a function of the conversion factor, the multiplied initial data element, and the data element of the converted sampling or scanning rate. This procedure utilizes all the data elements in the initial sequences and establishes a converted sampling or scanning rate with a significant reduction of processing steps.

12 Claims, 2 Drawing Sheets

1) $v(n) = X(n/L) \quad n = 0, \pm L, \pm 2L \cdots$
   $\phantom{v(n)} = 0 \quad\quad\quad\quad\text{otherwise}$ 2) $y(n) = \sum_{k=n-(\frac{N-1}{2})}^{n+(\frac{N-1}{2})} v(k) h(n-k)$ 3) $r(n) = y(nM) = \sum_{k=nM-(\frac{N-1}{2})}^{nM+(\frac{N-1}{2})} v(k) h(nM-k)$ 4) $r(n) = \sum_{j=\text{int}(\frac{nM}{L} - \frac{N-1}{2L})}^{\text{int}(\frac{nM}{L} + \frac{N-1}{2L})} X(j) h(nM-jL)$

SCAN RATE CONVERSION APPARATUS AND METHOD

BACKGROUND OF THE INVENTION

1. Field of the Invention

The invention relates to the conversion of an original data scan rate to a scan rate differing from the original and more particularly to the conversion from one scan rate to another by a non-integer factor.

2. Description of the Prior Art

High definition TV is a new picture transmission method which wil achieve significant improvements in picture quality over that presently provided. This enhanced picture reception is established by creating a picture of the highest quality at the studio. Transmitting a signal of such high quality over a distribution channel requires an excessive bandwidth and methods are being investigated to reduce required bandwidth without a significant degradation in received picture quality. Common to all the methods under investigation is the reduction of the total number of lines transmitted for each picture. To accomplish this without picture degradation requires a conversion from the original scan rate to a scan rate reduced for transmission. Since pixel on the horizontal scan lines are vertically aligned, scan rate conversion may be accomplished by vertically sampling the pixels, each pixel being a sample of the picture. Thus, scan rate conversion is a processing method akin to sampling rate changes in digital signal processing.

An analog signal may be digitally processed by sampling the time analog signal at a suitable rate. Once the sequence of samples is established the sample rate may be decreased by selecting every Mth sample of the original sequence, thus increasing the sampling period. In this process M is an integer and if the original sampling period is T the new sampling period is $T' = MT$. The original sampling produces a sequence of repetitive discrete-time Fourier transforms which are contiguous in the frequency domain if the sampling was at the Nyquist rate, i.e. sampling rate equal to twice the highest frequency in the Fourier transform of the time signal sample. Increasing the sampling period causes the discrete-time Fourier transform in the sequence to overlap and the highest frequencies of the transform to be reflected into the lower frequencies of the discrete-time transfrom (aliasing). Under these circumstances distortion may be avoided by passing the original sequence through an ideal low pass filter to cut off the offending high frequencies prior to the selection of each Mth sample of the sequence.

A sequence $x(n)$ originally sampled with a period T can be converted to a new sequence which appears to have been sampled with a period $T'' = T/L$ by inserting $L-1$ zero samples between each original sample. To produce this new sequence, however, a digital low pass filter must be used to clear the zero stuffed spectrum of unwanted spectral components in the frequency range between $\pi/T$ and $L\pi/T$. This zero stuffing establishes a Fourier transform for the new sequence that is a periodic continuation of the Fourier transform for the original sequence, the period being $2\pi/T$ rather than $2\pi/T''$ realized with a sampling period $T''$. To produce a signal spectrum that appears sampled at $T''$ it is necessary to provide a filter for removing the spectral images at $2m\pi/T$, where $m = 1, 2, \ldots (L-1)$.

When the sampling rate is altered by a factor L/M that is not an integer the decimation process of reducing the sampling rate by an integer is applied to the interpolation process which previously increased the sampling rate. To accomplish this every Mth sample of the interpolated sequence having a sampling rate L times that of the original sequence is selected. The effects of decimation on the interpolated spectrum results in repetitions of the original spectrum at $k(L/M)$ $(\pi/T)$ intervals without changing the spectral shape of the shifted Fourier transforms. If L/M is less than unity spectral repetitions overlap. To eliminate this overlapping the interpolation filter is designed to bandlimit the spectrum to $(L/M)$ $(\pi/T)$. To provide a sampling conversion of L/M, that is not an interger, it is therefore necessary to zero stuff sampling of the original sequence, pass the resulting spectrum through an appropriate filter, and then decimate the resulting sequence. In preforming this process a new sequencee is made L times longer than the original sequence. This requires the new sequence to be stored in L memories L times faster than the original sampling rate to prevent overflow, providing a filter that is L times faster than the original filter, and selecting but M of L available scan samples. This process is wasteful both of data and processing time.

SUMMARY OF THE INVENTION

The inefficient utilization of time and data by prior art devices is eliminated in the present invention by combining the interpolation, decimation and filtering processes. A scan rate converter in accordance with the present invention stores pixel data from a multiplicity of horizontal scan lines in a memory unit, multiplies the pixel data from a horizontal scan line by a weighting factor for that line, and sums the vertically aligned pixel data to obtain pixel data at the same relative position on the horizontal scan line of the converted scan rate. The selection of lines from the original scan rate to be combined to establish a scan line for the converted scan rate is determined by the position of the new scan line in the frame, the filter characteristics being utilized, and the scan rate conversion factor. In accordance with the invention the weight applied to an original scan line is a function of the position of that scan line in the frame as well as the position of the new scan line in its frame and the conversion factor.

DESCRIPTION OF THE PREFERRED EMBODIMENTS

Figures 1, 2:
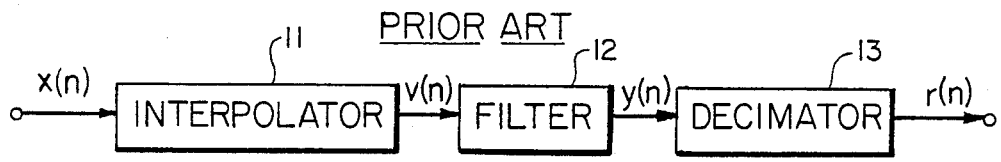
FIG. 1 is a block diagram of a data rate conversion circuit utilized in the prior art.
FIG. 2 is a listing of equations useful in explaining the invention.

A sampling rate conversion circuit of the prior art providing a non-integer conversion factor is shown in FIG. 1. The sequence of samples $x(n)$ obtained at a sampling rate that is to be converted is coupled to an interpolator 11 wherein zeros are added between the samples to establish a sampling rate L times the original sampling rate. The sequence at the output of the interpolator 11 $v(n)$ may be represented by equation 1 of FIG. 2, n/L being the index for the new sequence. This new sequence is coupled to filter 12 for the removal of unwanted spectral components, wherefrom a sequence $y(n)$ emerges. This new sequence $y(n)$ is a convolutional sum of v(n) and h(n) shown in equation 2 of FIG. 2, h(n) being the impulse response of the filter. Filter 12 may be a finite impulse response (FIR) digital filter to minimize phase distortion. In equation 2, N is the number of filter taps. The sequence y(n) is then coupled to a decimator 13 wherein the sampling rate of y(n) is reduced by a factor M by retaining only one of every M samples of the sequence y(n). The output sequence from decimator 13 r(n), represented by equation 3 of FIG. 2, is the desired sequence at the altered sampling rate that is equal to L/M times the original sampling rate.

Thus, prior art devices alter the sampling rate of an original sequence by coupling this sequence to an interpolator to obtain a sequence at an increased sampling rate, coupling the sequence at the increased sampling rate to a filter for the removal of unwanted spectral images, and then coupling filtered sequence to a decimator for a sampling rate reduction. This process is both time consuming and inefficient in the utilization of data contained in the original sequence.

From equation 1 it should be recognized that v(k) is equal to x(k/L) when k/L is an integer and a zero otherwise. Equation 3 may be rewritten with $j=k/L$ to obtain r(n) in the form shown in equation 4 of FIG. 2, wherein int(u) is the largest integer of the value u. It is evident from equation 4 that the desired interpolated sequence r(n) may be obtained directly from the input sequence x(j).

An inspection of equation 4 indicates that the number of multiplications required to obtain each element in the sequence r(n) is proportional to N/L, the maximum number being 2int $(N-2)/2L)+3$. Additionally, those skilled in the art should recognize that the impulse response h(n,j) is equal to the impulse response h(n+L, j+M). This impulse response recursion reduces the number of weighting factors which must be stored for multiplying the elements in the original sequence to obtain the interpolated sequence r(n). Table 1 illustrate the multiplications and summations performed for elements 2 through 9 to obtain a new sequence for a conversion factor L/M, where L=4 and M=5, utilizing a FIR filter for which N=15

TABLE 1

| r(2) | = | x(4)h(−6) | + | x(3)h(−2) | + | x(2)h(2) | + | x(1)h(6) | + | x(0)h(10) |
|---|---|---|---|---|---|---|---|---|---|---|
| r(3) | = | x(5)h(−5) | + | x(4)h(−1) | + | x(3)h(3) | + | x(2)h(7) | | |
| r(4) | = | x(6)h(−4) | + | x(5)h(0) | + | x(4)h(4) | + | x(3)h(8) | | |
| r(5) | = | x(8)h(−7) | + | x(4)h(−3) | + | x(6)h(1) | + | x(5)h(5) | + | x(4)h(9) |
| r(6) | = | x(9)h(−6) | + | x(8)h(−2) | + | x(7)h(2) | + | x(6)h(6) | + | x(5)h(10) |
| r(7) | = | x(10)h(−5) | + | x(9)h(−1) | + | x(8)h(3) | + | x(7)h(7) | | |
| r(8) | + | x(11)h(−4) | + | x(10)h(0) | + | x(9)h(4) | + | x(8)h(8) | | |
| r(9) | = | x(13)h(−7) | + | x(12)h(−3) | + | x(11)h(1) | + | x(10)h(5) | + | x(9)h(9) |

Since a FIR filter has an impulse response h(n) which is non zero only when the magnitude of n is less than or equal to $(N-1)/2$, all impulse responses in Table 1 for which $(nM-jL)$ is greater than $(N-1)/2$ are zero. This provides a further simplification in the processing as illustrated in Table 2 wherein the elements 2 through 5 in the interpolated sequence are shown with the zero impluse terms eliminated.

TABLE 2

| r(2) = | x(4)h(−6) + | x(3)h(−2) | + | x(2)h(2) | + | x(1)h(6) |
|---|---|---|---|---|---|---|
| r(3) = | x(5)h(−5) + | x(4)h(−1) | + | x(3)h(3) | + | x(2)h(7) |
| r(4) = | x(6)h(−4) + | x(5)h(0) | + | x(4)h(4) | | |
| r(5) = | x(8)h(−7) + | x(7)h(−3) | + | x(6)h(1) | + | x(5)h(5) |

Figure 3:
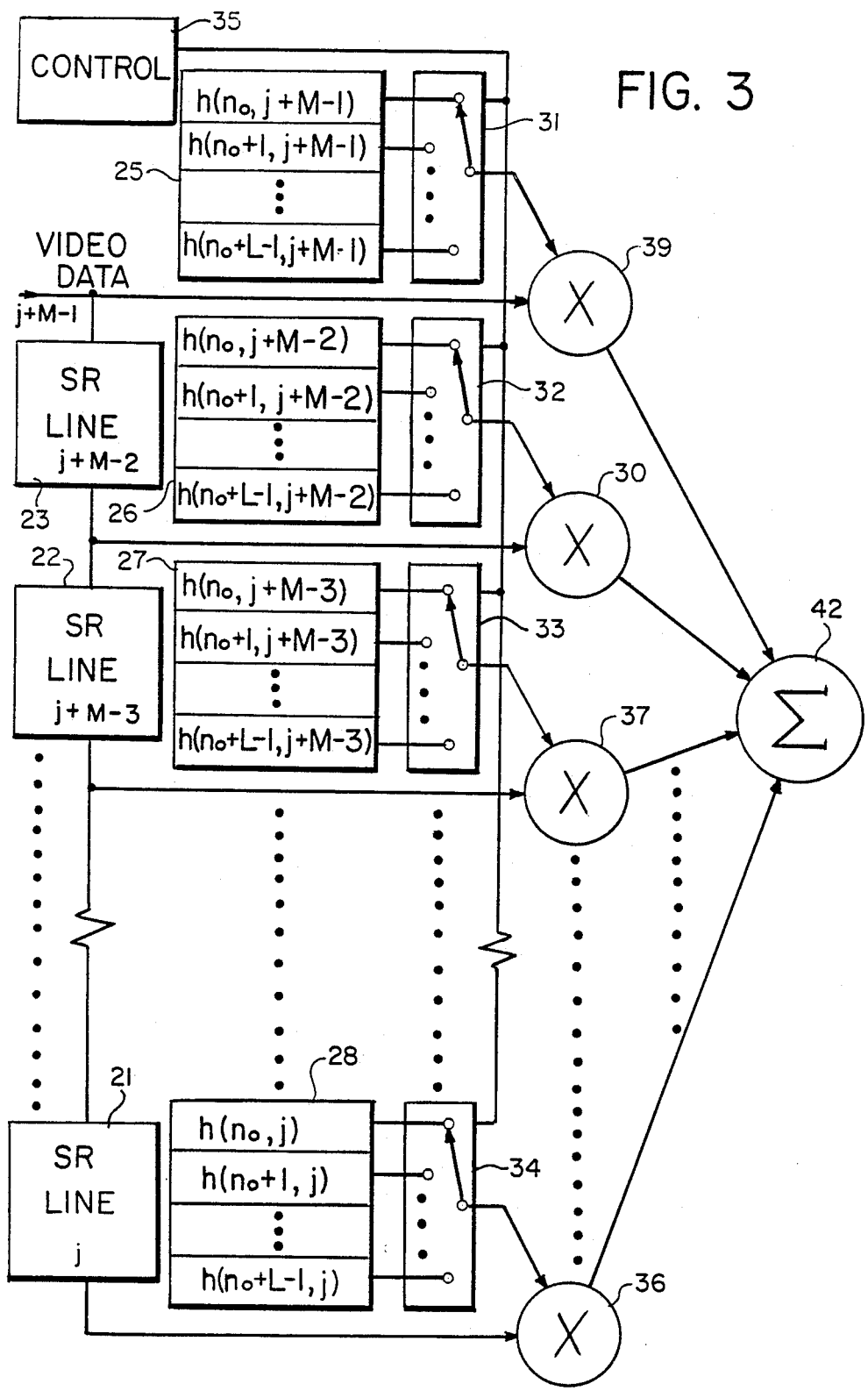
FIG. 3 is a block diagram of a preferred embodiment of the invention.

Refer now to FIG. 3 wherein a block diagram of a scan converter optimized in accordance with the present invention is shown. Video data at the original scan rate are sequentially entered into M serially coupled shift registers, three of which 21, 22, and 23 are shown. Each shift register is capable of storing sampled data from one complete scan line. Multiplicative factors representative of the impulse responses to be applied to each data unit are entered into M storage units, four of which 25 through 28 are shown in the Figure. Each storage unit 25 through 28 are coupled to provide the multiplicative factors to a corresponding multiplexers. These multiplexes 31 through 34 couple the appropriate weighting factor on command from a control unit 35 to multipliers 36 through 38, which are also coupled to receive the data samples to which the weighting factors are to be applied. The weighted samples at the output terminals of the multipliers 36 through 39 are coupled to a summation network 42, the output of which is the data sample r(n) of the converted scan rate.

At the initiation of a scanning process multiplexers 31 through 34 are initially set to provide the proper weighting factor to each element of the first M scan lines required to obtain the data for the first scan line of the converted scan rate. These weights are applied to the data at the output terminals of the shift registers after the registers have been filled with all the data on the first M−1 scan lines of the original scan rate. Thus the first data elements on scan lines j through j+M−2 are coupled respectively from shift registers 21 through 23 to the multipliers 36 through 38. The first data point of the j+M−1 scan line is directly coupled to multiplier 39 for multiplication by the weighting factor selected by multiplexer 31. The initial data point on the j+M−1 scan line is also entered into shift register 23 to commence the storage of the data on this line into the shift register. Entry of the first data point on the j+M−1 line to shift register 23 causes the second data point of the scan line j+M−2 to appear at the output of shift register 23 for coupling to multiplier 38 and for entry into shift register 22 which provides a second data point of the scan line j+M−3 at the output thereof for coupling to multiplier 37 and the subsequent shift register. When all the second data points on the scan lines j through j+M−1 appear at the output of the shift registers and on the video data line, they are multiplied and the resulting products coupled to summation network 42 to provide the second data point on the initial scan line of the converted scan rate.

This process continues until all the data points on the first M scan lines of the original scan rate have been processed to obtain the initial scan line for the converted scan rate. After all the data on the j+M−1 scan line of the original scan rate has been processed and entered into the shift register 23 control 35 causes multiplexers 31 through 34 couple the weighting factors to be applied to the j+1 through j+M scan lines to produce the data points on the $n_0+1$ scan line of the converted scan rate. This switching occurs during the horizontal blanking interval of the scanning system. Storing units 25 thorough 28 each have stored therein L weighting factors which are utilized to obtain data points for L scan lines for the converted scan rate. When these L scan lines of the converted scan rate are obtained M+L−1 scan lines of the original scan rate have been utilized. It should be recognized from the summation limits of equation (4) that the data points for the next scan line, i.e. $n_0+L$, are obtained from the data on scan lines commecing with j+M of the original scan rate. Since h(n+L, j+M) is equal to h(n,j), the muliplexers 31 through 34 are set at the initial weighting factors and the process continues as described above until the next L scan lines in the new rate are obtained, after which the multiplexe are again reset to the original value and the next L scan lines for the new scan rate obtained.

While the invention has been described in its preferred embodiments, it is to be understood that the words which have been used are words of description rather than limitation and that changes may be made within the purview of the appended claims without departing from the true scope spirit of the invention in its broader aspects.

I claim:

1. An apparatus for providing a conversion from a first scan rate to a second rate comprising:
    means for receiving data on horizontal scan lines of said first scan rate;
    means coupled to said receiving means for storing said data of said horizontal scan lines of said first scan rate;
    means for providing multiplicative factors, each corresponding to at least one of said horizontal scan lines of said first scan rate and associated with at least one horizontal scan line of said second scan rate;
    means coupled to said storing means and said multiplicative factor providing means for multiplying data of a horizontal scan line of said first scan rate by a multiplicative factor corresponding to that horizontal scan line and its associated horizontal scan line of said second scan rate to obtain weighted data; and
    means coupled to said multiplying means for summing correspondingly positioned weighted data of said horizontal scan lines of said first scan rate to provide correspondingly positioned data on horizontal scan lines of said second scan rate.

2. An apparatus in accordance with claim 1 wherein said multiplicative factors are representative of impluse responses of a finite impluse response filter having N taps.

3. An apparatus in accordance with claim 2 wherein said second scan rate is equal to a constant times said first scan rate, said constant being a ratio having a numerator L and a denominator M, L and M being integers, said multiplicity of scan lines are within a range j equal to a highest integer of (nM/L−(n−1)/2L) and a highest integer (nM/L+(n−1)/2L), where j is a jth scan line of said first scan rate, n is a nth scan line of said second scan rate, and each multiplicative factor is h(nM−jL), an impluse response of said finite impluse response filter.

4. An apparatus for converting a first sampling rate to a second sampling rate by a selected conversion factor comprising:
    means for receiving data elements obtained at said first sampling rate,
    means coupled to said receiving means for storing data elements obtained at said first sampling rate;
    means for providing multiplicative factors, each corresponding to at least one data element of said first sampling rate, each multiplicative factor being a function of said at least one data element of said first sampling rate, a pre-selected data element of said second sampling rate, and said sampling rate conversion factor;
    means coupled to said storing means and said multiplicative factors means for multiplying a multiplicity of said data elements by corresponding multiplicative factors to obtain weighted data elements; and
    means coupled to said multiplying means for summing said weighted data elements in predetermined groups to obtain data elements of said second sampling rate.

5. An apparatus in accordance with claim 4 wherein said multiplicative factors are representative of impluse responses of a finite impulse response filter having N taps.

6. An apparatus in accordance with claim 5 wherein said second sampling rate equals a constant times said first sampling rate, said constant being a raito having a numerator L and a denominator M, L and M being integers, said multiplicity of data elements are within a range j between highest integer of (nM/L−(N−1)/2L) and highest integer of (nM/L+(N−1)/2L, where j is a jth sample of said first sampling rate, n is a nth sample of said second sampling rate, and said multiplicative factors are impulse responses h(k) of said filter, k being equal to (nM−jL).

7. A method for converting a first scan rate to a second scan rate that is equal to a constant times said first scan rate, the constant being a non-integer ratio having a numerator L and a denominator M, L and M being integers, comprising the steps of :
    storing data elements of horizontal scan lines of said first scan rate, said horizontal scan lines being designated j;
    generating multiplicative factors each corresponding to at least one said horizontal scan lines of said first scan rate, associated with a horizontal scan line of said second scan rate;
    multiplying data elements on a horizontal scan line by said multiplicative factors corresponding to that horizontal scan line and its associated horizontal scan line of said second scan rate; and
    summing data elements at equally positioned locations on said multiplicity of horizontal scan lines of said first scan rate to obtain data elements on a horizontal scan line of said second scan rate at positions corresponding to said locations on said multiplicity of horizontal scan lines of said second scan rate, said horizontal scan lines of said second scan rate being consecutively numbered n=1, 2,..

8. The method of claim 7 wherein said multiplicative factors are representative of impulse responses h(k) of a finite impluse response filter having N taps, k being equal to (nM−jL).

9. The method of claim 8 wherein said multiplicity of horizontal scan line selected include horizontal scan lines between $j_1$ and $j_2$, where $j_1$=int(nM/L−(N−1)/2L) and $j_2$ =int (nM/L+(n−1)/2L), and k=(nM−jL), L and M being integers.

10. A method for converting a first sampling rate by a non-integer conversion factor to a second sampling rate comprising the steps of:

storing data elements obtained at said first sampling rate to provide a multiplicity of stored data elements;

generating multiplicative factors each corresponding to at least one data element of said first sampling rate, a data element of said second sampling rate associated with said at least one data element of said first sampling rate, and said conversion factor;

means coupled to said storing means and said multiplicative means for multiplying a multiplicity of said data elements by respectively corresponding multiplicative factors to obtain a multiplicity of weighted data elements; and means coupled to said multiplying means for summing said multiplicity of weighted data elements to obtain data elements of said second sampling rate.

11. The method of claim 10 wherein said multiplicative factors are representative of impulse response of a finite impulse response filter having N taps.

12. The method of claim 11 wherein said conversion factor is a ratio having a numerator L and a denominator M, said multiplicity of data elements are within a range j between highest integer of, $(nM/L-(N-1)/2L)$ and highest integer of $(nM/L+(N-1)/2L)$, where j is a jth sample of said first sampling rate and n is a nth sample of said second sampling rate, and said multiplicative factors are impulse respones $h(k)$ of said finite impulse response filter, k being equal to $(nM-jL)$, L and M being integers.

* * * * *